(12) United States Patent
Giacotto

(10) Patent No.: US 9,036,135 B2
(45) Date of Patent: May 19, 2015

(54) DISTANCE MEASURING DEVICE

(71) Applicant: Vectronix AG, Heerbrugg (CH)

(72) Inventor: Luca Giacotto, Au (CH)

(73) Assignee: Vectronix AG, Heerbrugg (CH)

( * ) Notice: Subject to any disclaimer, the term of this patent is extended or adjusted under 35 U.S.C. 154(b) by 235 days.

(21) Appl. No.: 13/684,345

(22) Filed: Nov. 23, 2012

(65) Prior Publication Data

US 2013/0135606 A1 May 30, 2013

(30) Foreign Application Priority Data

Nov. 25, 2011 (EP) ..................................... 11190783

(51) Int. Cl.
*G01C 3/08* (2006.01)
*G01S 17/10* (2006.01)
*G01S 7/486* (2006.01)

(52) U.S. Cl.
CPC . *G01C 3/08* (2013.01); *G01S 17/10* (2013.01); *G01S 7/4861* (2013.01); *G01S 7/4868* (2013.01)

(58) Field of Classification Search
CPC ......... G01C 3/08; G01S 17/10; G01S 7/4868; G01S 7/497; H03G 3/3084
USPC ................................................ 356/3.01–28.5
See application file for complete search history.

(56) References Cited

U.S. PATENT DOCUMENTS 5,428,439 A 6/1995 Parker et al.
2010/0195088 A1* 8/2010 D'Aligny et al. ............ 356/5.01

FOREIGN PATENT DOCUMENTS

| EP | 1311873 | 5/2003 |
| EP | 2071358 | 6/2009 |
| EP | 2315053 | 4/2011 |
| WO | 2006063740 | 6/2006 |
| WO | 2007022927 | 3/2007 |

* cited by examiner

*Primary Examiner* — Luke Ratcliffe
(74) *Attorney, Agent, or Firm* — Muncy, Geissler, Olds & Lowe, P.C.

(57) ABSTRACT

The invention relates to an electro-optical distance measuring device comprising a transmitting unit comprising a light source for emitting intensity-modulated optical radiation, a receiving unit for receiving a portion of the optical radiation, said portion being reflected from a target object, by means of a photosensitive electrical component and for converting it into an electrical reception signal. Furthermore comprising a conditioning unit for conditioning the reception signal comprising at least one amplifier stage, an analog-to-digital converter fox digitizing the conditioned reception signal, and an electronic evaluation unit, which is designed in such a way that a distance from the distance measuring device to the target object, can be determined on the basis of a signal propagation time with the aid of the digitized reception signal. According to the invention, in this case the amplifier stage is designed in such a way that it has a non-linear input-output characteristic.

19 Claims, 6 Drawing Sheets

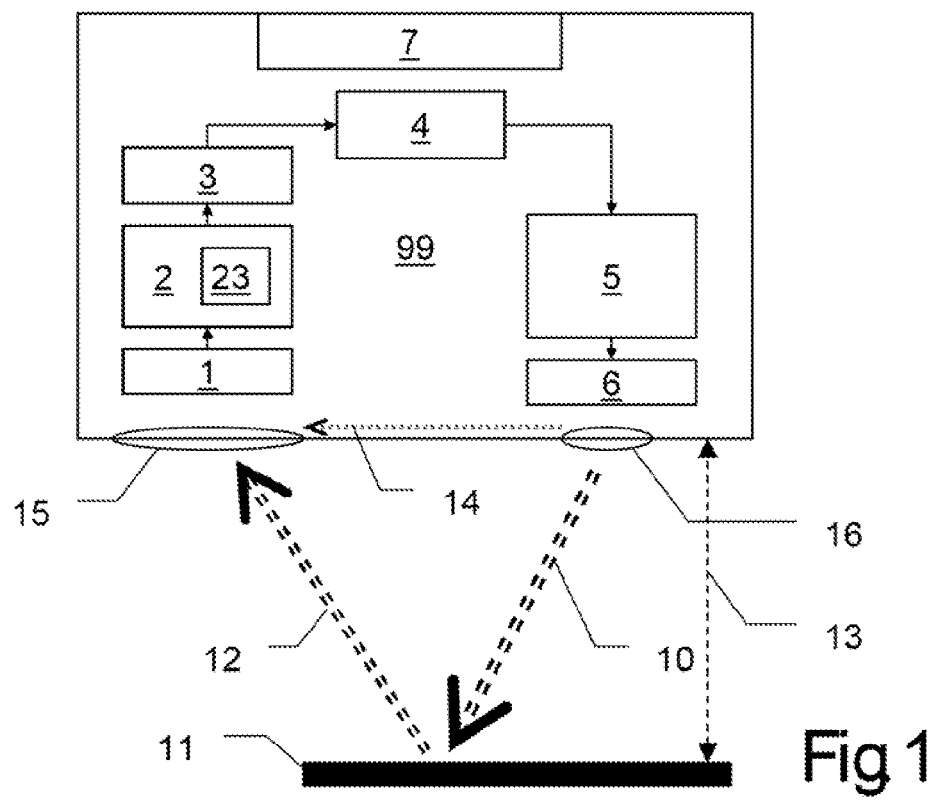
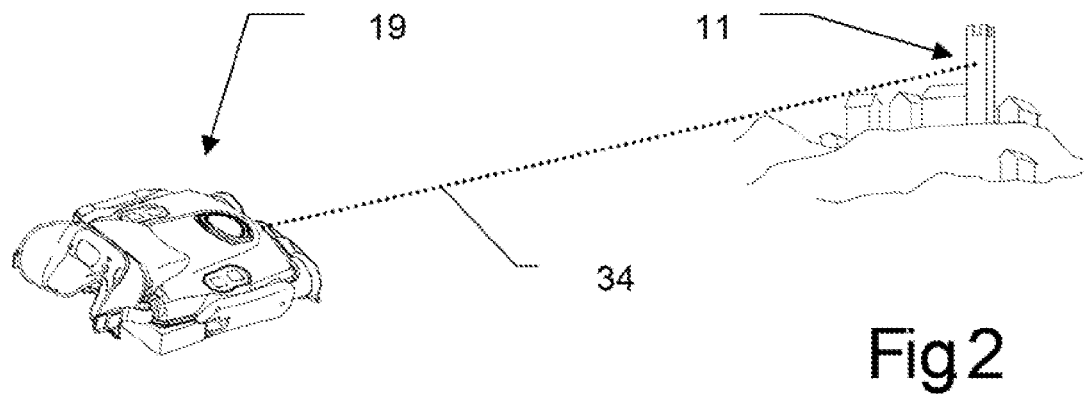

DISTANCE MEASURING DEVICE

This application claims priority to European Patent Application No.: 11190783.8, which was filed in Europe on Nov. 25, 2011, and which is herein incorporated by reference in its entirety.

BACKGROUND OF THE INVENTION

1. Field of the Invention

The invention relates to a distance measuring device according to the preamble of Claim 1, and to a distance measuring method according to the preamble of Claim 10.

2. Description of the Background Art

In electro-optical distance measuring devices (EDM), an optical signal is emitted from the apparatus in the direction of the target object—whose distance it is necessary to determine—for example as optical radiation in the form of laser light. If visible light is used in this case, then the point aimed at for measurement on the target object can be visually discerned. By contrast, if non-visible wavelengths, e.g. in the infrared range, are used, then aiming at the point to be measured can be carried out by means of an optical device, far example by means of a crosshair in an observation device. The surface of the target object reflects at least part of the optical signal, usually in the form of a diffuse reflection. The reflected optical radiation is converted into an electrical reception signal by a photosensitive element in the apparatus. With knowledge of the propagation velocity of the optical signal and with the aid of the propagation time determined between emission and reception of the signal (that is to say that propagation time which is required by the light for covering the distance from the apparatus to the target object and back), it is possible to determine the distance between apparatus and target object. In this case, optical components for beam shaping, deflection, filtering, etc.—such as, for instance, lenses, wavelength filters, mirrors, etc.—are usually situated in the optical transmission and/or reception path. In this case, the emission and reception can be effected coaxially or by means of two adjacent optical units. Distance measuring devices of this type can be designed as independent apparatuses, but can also be integrated into other apparatuses, for example into surveying apparatuses such as theodolites or taekymeters, or into observation apparatuses such as telescopes, monoculars, binoculars, night vision apparatuses, etc.

In order to compensate for influences which might corrupt the measurement results (for example temperature influences, component tolerances, drifting of electronic components, etc.), part of the emitted optical signal can be guided as a reference signal via a reference path of known length from the light source to a light-sensitive receiving element. In this case, the reference path can be fixedly incorporated in the apparatus or be designed for example as an optical deflection element that can be pivoted in or plugged on. The reception signal resulting from said reference signal can be received by the photosensitive element which is also used for measurement or by a further photosensitive element provided specially for the reference signal. The resulting electrical-reference signal can be used for referencing and/or calibrating the measured values determined.

In order to obtain a correspondingly high accuracy of the distance measurement, on account of the high propagation velocity of optical radiation, the requirements made of the temporal resolution capability in electro-optical distance measuring devices (EDM) are extremely high. By way of example, for a distance resolution of 1 m, a time resolution having an accuracy of approximately 6.6 nanoseconds is required.

With regard to the signal power that can be emitted, limits are prescribed for the electro-optical EDM under consideration here. Thus, when laser light is emitted, eye safety determines a maximum permissible average signal power which is allowed to be emitted. In order nevertheless to obtain for the measurement sufficiently strong signal intensities which can be detected by the receiver, pulsed operation is employed. The emitted optical signal is modulated in a pulse-like manner in its intensity amplitude. Short pulses having a high peak power are emitted, followed by pauses without light emission. Consequently, the reflected portion of the pulses has a sufficiently high intensity to be able to evaluate the latter from the background disturbances and noise, in particular even when background light (sunlight, artificial lighting, etc.) is present, without the safety-related maximum permissible average emission power being exceeded in this case.

As described in EP 1 311 873, for instance, the emission of packets of pulses followed by pauses without pulse emission—so-called burst operation—can also be employed in this case in order to obtain a reduced average power of the transmission signal and also an improved signal-to-noise ratio (SNR). The number of pulses per packet can be varied depending on the evaluation concept and measurement situation.

In order to determine the propagation time of the signal, firstly the so-called time-of-flight (TOF) method is known, which determines the time between the emission and reception of a light pulse, the time measurement being effected with the aid of the edge, the peak value or some other characteristic of the pulse shape. In this case, pulse shape should be understood to mean a temporal light intensity profile of the reception signal, specifically of the received light pulse—detected by the photosensitive element. The signals of a plurality of pulses can also be accumulated in correct phase relation for the evaluation, in order to improve the signal-to-noise ratio. The point in time of transmission can be determined either with the aid of an electrical pulse for initiating the emission, with the aid of the signal applied to the transmitter, or with the aid of a reference signal mentioned above.

Secondly, the so-called phase measuring principle is known, which determines the signal propagation time by comparison of the phase angle of the amplitude modulation of the transmitted and received signals. In this case, however, the measurement result in the case of one transmission frequency has ambiguities in units of the signal, period duration, thus necessitating further measures for resolving these ambiguities. By way of example, WO 2006/063740 discloses measurement with a plurality of signal frequencies which result in different unambigaity ranges, as a result of which incorrect solutions can be precluded. WO 2007/022927 is also concerned with unambiguities in phase measurement.

The intensity of that portion of the emitted light which is reflected from the receiver is dependent on various factors and can therefore also vary greatly. In this case, a dominant influencing variable that can be mentioned is firstly the distance to the target object, with which the expansion of the emitted measurement light increases and also the signal attenuation as a result of atmospheric disturbances such as mist, fog, heat haze or dust increases on account of the longer path. In distance measuring devices, large working ranges are often required in this case, for example from the cm to the km range. In observation apparatuses comprising distance measuring devices (for instance night vision apparatuses, telescopic sights, telescopes, binoculars, etc.) there are often ranges of from a few meters to many kilometers, for instance from 5 m to 20 km or 30 km, and this is with a measurement accuracy of a few meters or even less, for example of ±1 m to ±5 m.

Secondly, the reflectivity of the target object for the wavelength used for the measurement also influences the intensity of the reflected light portion, which can fluctuate in a range from a virtually 100% reflective target object to an almost totally absorbent target object.

If the received signal is too weak, then it can no longer be identified unambiguously from the background noise or the ambient light, and, on account of the poor signal-to-noise ratio, only an inaccurate or in the worst case no distance measurement at all is possible. By contrast, if the received optical signal is too strong, this can lead to a saturation in the receiver, e.g. of the receiving element, of an amplifier stage or of an A/D converter. An accurate distance measurement is likewise made more difficult or impossible by such a saturation.

With regard to the compensation of distance-dependent intensity differences, EP 2 071 358 discloses a solution in which a polarization filter is positioned in the receiver optical unit in such a way that, on account of the different angle of incidence, the light from near targets is attenuated, but the light from distant targets is not attenuated.

Even when an internal reference path is used, large intensity differences can occur between reference signal and measurement signal; specifically, if the reference path has a constant, invariable coupling-out rate and the emission power and/or the gain factor of the receiver are/is varied, the dynamic range between reference signal amplitude and reception signal amplitude can very soon reach the limits of the resolution capability of the A/D converter.

In the so-called multi-target case as well, if the measurement light is reflected from a plurality of objects at different distances along the measuring direction, the signal evaluation proves to be difficult on account of the different intensities of the returning radiation, in particular if the same receiver is used for the reference light and the measurement light. By way of example, in the case of a distance measurement through a window pane or a glass pane (for instance in a building or in a vehicle), said pane, on account of its proximity, can reflect a higher proportion of light than the actual target object of the measurement. Consequently, the identification of the measurement light can be difficult, specifically if the reflection of the pane brings the receiver to saturation, whereupon said receiver requires a certain time for regeneration and for reducing the saturation and re-establishing the normal operating state. To put it another way, during this time the receiver is dazzled, as it were, that is to say virtually blind to the actual measurement signal. Similar effects can also occur in the case of measurements just past edges, through bushes or tree tops, through mist banks, through fog, through smoke, through dust, etc. A similar effect can also occur for example in apparatuses having coaxial optical axes, in which disturbing reflections of the transmission signal fed in at the apparatus optical unit can reach the receiver. Although these disturbance signals can, if appropriate, also be used as reference path signals, these can also lead to saturation problems in the receiver or the problems mentioned with regard to the reference path.

Ideally, the modulation range of the measuring circuit should be utilized as fully as possible during the measurement, but without overdriving occurring in this case. In order to achieve this, two basic parameters are available in the EDM: firstly a variation of the intensity of the emitted light and secondly a variation of the amplification or attenuation of the received light.

The transmission intensity can be achieved by control of the optical output power. Since mechanical or optical signal attenuations are usually mechanically not robust enough or too complex in an automated realization, a modification of the output power is preferably carried out by means of a variation of the electrical driving of the light-emitting component, e.g. of an LED or of a laser, specifically of a semiconductor laser. The highly non-linear output characteristic of semiconductor lasers and also the highly temperature-dependent emission behaviour make such control more difficult in practice, however. For the circuit design it is a challenge to ensure a corresponding laser driver circuit with output power control in wide operating ranges and with eye safety being ensured, in particular when the distance measuring device is used in the field in temperature ranges of, for example, −20 to +60° C.

In the receiver, it is possible to influence primarily the gain of the circuit upstream of the analogue-to-digital converter. Firstly, it is possible to vary the gain (or the bias voltage of an avalanche photodiode used as receiving element). Secondly, if the saturation of the optoelectrical receiving element does not constitute the limit of the dynamic range, it is also possible to vary a gain in the subsequent electronic signal conditioning, specifically in an amplifier stage. However, such interventions in the gain factors usually also result in parasitic effects, such as, for instance, variation of the noise factors, system dynamic range, bandwidth, and in particular of the signal delays or signal propagation time in the electronics. On account of the high distance or time measurement accuracy required in EDMs, such influences have appreciable effects on the measurement result. In order nevertheless to be able to obtain a sufficient measurement accuracy, calibration parameters, often specific to each EDM, usually have to be determined in complex calibration processes.

For reasons mentioned above, in many cases gain and/or output power are/is varied in discrete steps. For each step (or combination of steps in the case of a plurality of variable intervention points), a respective set of calibration parameters is determined. In this case, the steps or combinations of steps are also designated as operation modes. By way of example, a respective set of calibration parameters may be necessary for each of the possible output and input configurations, wherein covering the required working ranges and target reflectivity ranges necessitates a corresponding number of gradations of output power and/or input gain.

SUMMARY OF THE INVENTION

The abovementioned solutions known from the prior art should therefore be regarded, in their known form, as unsatisfactory for covering the dynamic intensity range to be dealt with by distance measuring devices, without at the same time obtaining a complex and costly evaluation system, in particular with a multiplicity of calibration parameters.

One problem addressed by the present invention is that of improving an optoelectronic distance measuring device, in particular increasing the robustness of the measurement in a wide distance and reflectivity range of the target object to be measured.

One problem addressed here is that of improving the dynamic range of the light intensity that can be detected by the receiver, in particular without at the same time increasing the resolution of the analogue-to-digital conversion.

Improving and simplifying the distance measuring device by simplifying the calibration is a farther problem addressed, specifically with a reduction of the number of calibration parameters to be determined.

Another problem addressed, is that of reducing the number of necessary operating modes which, are required in the prior art for covering large working ranges and/or target reflectivities.

A specific problem addressed here is, in particular, that of providing a receiving unit for a distance measuring device with which a higher dynamic range of the optical input signal can be detected.

An electro-optical distance measuring device according to the invention, in particular a laser distance measuring device, also designated as EDM (Electronic Distance Measuring device) or LRF (Laser Range Finder), for solving said problems according to the invention, is constructed with a transmitting unit comprising a light source, in particular a semiconductor laser or an LED, for emitting intensity-modulated optical radiation, a receiving unit for receiving a portion of the optical radiation, said portion being reflected from a target object, by means of a photosensitive electrical component and for converting it into an electrical reception signal, in particular comprising a photodiode, specifically an APD or PIN photodiode, at conditioning unit for conditioning the reception signal comprising at least one amplifier stage, an analogue-to-digital converter for digitizing the conditioned reception signal, and an electronic evaluation unit, which is designed in such a way that a distance from the distance measuring device to the target object can be determined on the basis of a signal propagation time with the aid of the digitized reception signal.

According to the invention, the amplifier stage is designed in such a way that it has a non-linear input-output characteristic.

To put it another way, the amplifier stage has a gain factor which is dependent on an amplitude value of the reception signal.

This should not be understood to mean a simple saturation of the amplifier which lies outside a specified operating range and occurs per se in ail known amplifiers. Moreover, the amplifier stage is not an AGC which performs a dynamic variation of its gain factor in order to obtain a constant output level. An amplifier stage which is driven externally and allows a changeover of the gain factor, for example from the evaluation unit, is not meant either.

The amplifier stage has the non-linear input-output characteristic below the saturation of the amplifier stage.

Specifically, the amplifier stage has a first gain factor for a first amplitude value of the input signal and at least one second gain factor, different from the first, for a second amplitude value of she input signal.

In this case, the amplifier stage within the meaning of the invention can also have a plurality of amplifying elements such as transistors or operational amplifiers.

The amplifier stage can have a first gain factor for reception signal amplitudes below a threshold value and have a second gain factor for reception signal amplitudes above the threshold value. In particular, the amplifier stage can be designed in such a way that it effects an amplitude dynamic range compression, specifically wherein the absolute value of the first gain factor is greater than that of the second gain factor.

The input-output characteristic can be a piecewise linear function, in particular with at least one knee point (which lies at the threshold value) and at least two discrete gain factor ranges each having a constant gain factor.

The input-output characteristic can be a continuous non-linear function, in particular logarithmic function, sinusoidal function, exponential function, parabolic function or function represented by a polynomial.

The electronic evaluation unit can be designed in such a way that it numerically compensates for the non-linearity of the amplifier stage and re-establishes a linear representation of the reception signal. In particular, the distance can be determined by means of a numerical compensation unit for computationally nullifying the non-linear input-output characteristic at the digitized reception signal, specifically with the aid of an inverse of the non-linear characteristic of the amplifier stage.

The non-linear input-output characteristic can be effected by a non-linear feedback of the amplifier stage, in particular wherein the latter can be achieved by a saturation of a component of the feedback of the amplifier stage, wherein, however, the totality of the amplifier stage and the photosensitive component remain unsaturated.

The non-linear feedback can be obtained by means of a diode or a zener diode in a feedback network, in particular by virtue of the voltage-dependent conductivity of said diode. By way of example, it is also possible to use a varistor for this purpose.

The non-linear input-output characteristic can be effected by a comparator circuit, which is designed in such a way that it changes over the gain factor of the amplifier stage between at least two values depending on an amplitude of the reception signal.

The invention also relates to an observation apparatus comprising a distance measuring device according to the invention, which observation apparatus has an optical axis of the observation direction which runs at least approximately parallel to the measuring direction of the distance measuring device.

The invention likewise relates to a distance measuring method comprising emitting amplitude-modulated optical radiation, in particular laser light, receiving a portion of the optical radiation, said portion, being reflected from a target object, by means of a photosensitive electrical component, which converts the received optical radiation into an electrical reception signal, amplifying the reception, signal in an amplifier stage, digitizing the amplified reception signal by means of an analogue-to-digital converter, and determining a distance from the distance measuring device to the target object on the basis of a signal propagation time by means of evaluating the digitised reception signal by means of an electronic evaluation unit.

According to the invention, in this case the amplification of the reception signal with compression of the amplitude dynamic range is effected by an amplifier stage having a non-linear input-output characteristic, in particular with a reception-signal-amplitude-dependent gain factor, specifically with a degressive gain factor towards higher signal amplitudes.

The amplification can be effected with a first gain factor A below a threshold value of the reception signal amplitude and with a second gain factor B above the threshold value, in particular wherein the first gain factor A can be greater than the second gain factor B.

The amplification can be effected with an input-output characteristic which is piecewise linear and has at least one knee point.

The evaluation of the digitized reception signal can be effected by means of numerical compensation of the non-linearity of the amplification, in particular by expanding the digitized reception signal with an inverse of the non-linear input-output characteristic for re-establishing a linear representation of the reception signal.

To put it another way, the invention also relates to a method for extending the detectable amplitude dynamic range of a receiving unit of an electro-optical distance measuring device, comprising compressing the amplitude range of a reception signal of the distance measuring device by means of an analogue, non-linear amplifier stage and digitizing the compressed amplitude range. Furthermore, numerically expanding the digitized amplitude range for re-establishing a linear representation of the reception signal for a distance determination by an evaluation unit can be part of the method.

The invention also relates to a computer program product comprising program code stored on a machine-readable carrier, or a computer data signal, embodied by an electromagnetic wave, for carrying out the above method, in particular wherein the program code carries out numerical compensation of a non-linear gain in an amplifier stage of a receiving unit of a distance measuring device, preferably if the program code is executed in an evaluation unit of an electro-optical distance measuring device having a non-linear amplifier stage.

BRIEF DESCRIPTION OF THE DRAWINGS

The method according to the invention and the device according to the invention are described in greater detail purely by way of example below with the aid of concrete exemplary embodiments illustrated schematically in the drawings, farther advantages of the invention also being discussed. Specifically in the figures:

FIG. 1 shows a first embodiment of a distance measuring device according to the invention as a block diagram;

FIG. 2 shows an exemplary illustration of an application of an EDM according to the invention;

Figure 3:
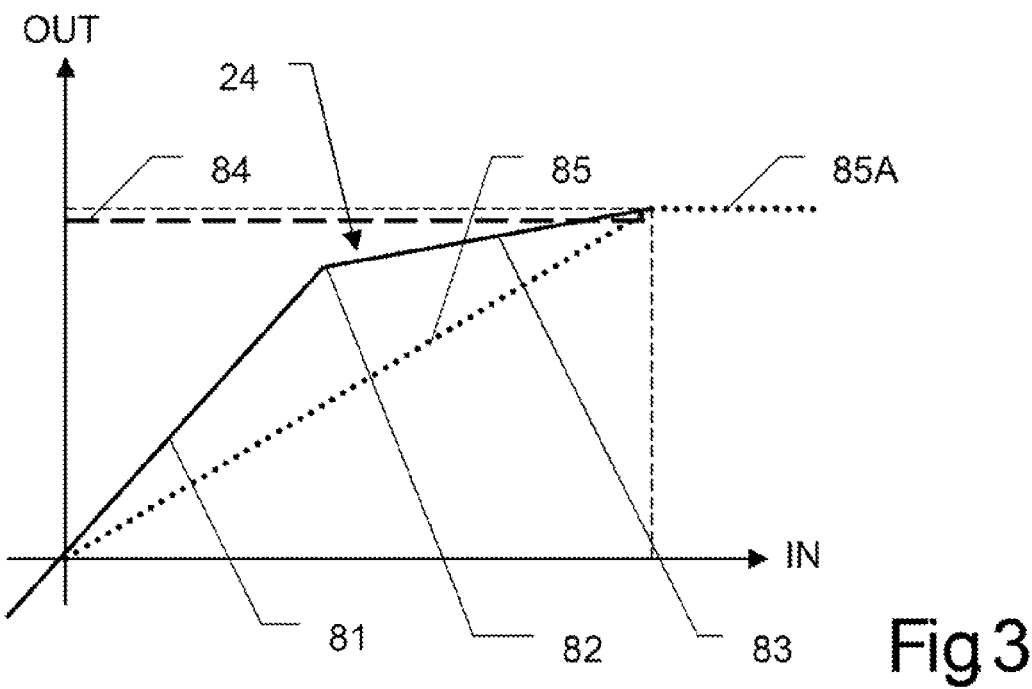
FIG. 3 shows an illustration of an exemplary first embodiment according to the invention of an input-output characteristic curve of an amplifier in an EDM.

The illustrations in the figures serve merely for illustrative purposes and should not be regarded as to scale. The schematic circuit diagrams illustrated in each case show the basic circuitry structure, which can be supplemented or modified by a person skilled in the art in accordance with general principles of development in electronics.

DETAILED DESCRIPTION

FIG. 1 shows an embodiment of an optoelectronic distance measuring device 99 according to the invention as a block diagram. This can be, for example, a battery-operated distance measuring device which is incorporated into an observation apparatus and which can be used for aiming at and determining target coordinates of a target object 11. However, the principle according to the invention can also be applied to distance measuring devices in other surveying apparatuses.

The transmitting unit is illustrated in the right-hand half of the distance measuring device block 99, and the receiving unit in the left-hand half. In this case, the separation of the two units as described here should be seen as primarily functional and can (but need not) be constructed in the form of two physically separated units. It is possible to realize embodiments in which both units are accommodated on a common printed circuit board, and likewise embodiments in which the distance measuring components are divided among a plurality of printed circuit boards, also arranged spatially separately.

The target object 11 whose distance 13 is to be determined reflects at least part of the electromagnetic radiation 10 emitted by the transmitting unit as reception radiation 12 to the receiving unit. In this case, part of the emitted radiation can also foe guided as a reference beam 14 via a reference path of known length to the receiving unit. In this case, a respective dedicated or else a common receiving unit can be provided for the reference beam 14 and the measurement beam 10. In the case of a dedicated reference receiver, the receiving unit or parts thereof should correspondingly be embodied doubly. A changeover of the beam guiding between reference beam 14 and measurement beam 10 is also possible, for instance by means of a reference deflection device that is internal within the apparatus or can be fitted externally. However, a distance measuring device without an optical reference path can also be involved.

By virtue of the target object 11 illustrated disproportionally near in FIG. 1, the transmission beam 10 and reception beam 12 are illustrated at an unusually steep angle with respect to one another. In practical embodiments, the transmission and reception beam paths (that is to say the optical axes thereof) are oriented, in such a way that they intersect at a predefined distance; particularly in the case of relatively large measurement distance ranges, they can be regarded as approximately parallel to one another. Embodiments comprising specific optical units that effect distortion in an angle-dependent manner at the receiver are also known, in order to be able to cover a wide distance range. Embodiments having coaxial optical axes of the transmission and reception beam paths are also known, for example by reflecting the transmission beam 10 to the region of the centre of the receiving lens 15.

In the distance measuring device 99, a block diagram of an exemplary internal construction of an embodiment of the transmitting and receiving unit is in each case illustrated, which will now be discussed by way of example.

The embodiment of the transmitting unit shown by way of example comprises a control processor 4 and a drive stage 5 for the light-emitting component 6, which converts the electrical signals of the driver stage 5 into electromagnetic radiation 10, 14. By way of example, semiconductor light sources, e.g. semiconductor lasers, semiconductor-pumped lasers or light-emitting diodes, can be used as light emitter 6. The emitted light is concentrated by an optical unit 16 to form a directed beam 10 having low divergence. In this case, the driver stage 5 is adapted to the emission characteristics of the light source 6 in order to generate the intensity-modulated optical transmission radiation 10. In this case, the intensity of the emitted light signals 10 can be predefined by the control unit 4, for example in a plurality of discrete steps or else continuously. Such, variation of the optical output power can be used—as already explained—in order, depending on how much of the transmitted light 10 is received, to obtain a reception signal in an intensity range that can be evaluated by the receiver unit, in particular in an intensity range that can be evaluated advantageously, as is explained below.

If the reception signal is, for example, very weak, relative to the signal noise, or not detectable at all, then the intensity of the transmission signal can be increased (e.g. in a stepwise manner) until a determination of the distance is possible. Conversely, in the case where the receiver is overdriven, the emission power can be decreased until saturation of the input circuit no longer occurs. Such regulation for finding the suitable operating mode of the transmitter requires time and energy since no or only an inaccurate distance measurement, can be carried out during this regulation. Since altering the emission power is also accompanied by other, parasitic effects, the output power can be varied between discrete steps for which an at least partial compensation of the parasitic effects can be carried out with the aid of calibration parameters. The calibration parameters required for this purpose have to be correspondingly predetermined in each case for the corresponding transmission power (this is also referred to as transmitter-side operating modes).

Specifically on account of the great temperature dependence of the emission power of laser diodes, the driver stage 5 can contain a control loop for complying with the desired optical transmission power, which is monitored, by means of a monitor photodiode, for example. Compliance with safety conditions, for instance complying with eye safety guidelines, by the laser driver stage 5 can also be performed.

In the embodiment shown, the control processor 4 can be ascribed both to the transmitting unit and to the receiving unit and controls the sequences for determining the distance. In other embodiments, it is also possible to use a plurality of control processors 4 which each perform specific partial tests. The control processor 4 can be for example a digital computer, such as a microprocessor or DSP, for instance, but can also be embodied as an FPGA or ASIC or with at least partly hardwired logic.

The block 7 represents the voltage supply of the distance measuring device, which can contain besides supply filters if appropriate also a voltage stabilization or control or a boost or buck converter. The voltage supply can be effected by means of batteries, rechargeable batteries or other apparatus-internal or -external electrical energy sources.

The receiving unit converts received electromagnetic radiation 12 into an electrical signal by means of the receiving element 1, said electrical signal being conditioned in the block 2, as a conditioning unit for further processing. The conditioning can comprise impedance conversion, filtering, amplification, band limiting, heterodyne or homodyne mixing etc. The conditioning unit 2 can therefore comprise, for example, an input filter, a (transimpedance) amplifier, a mixing stage, a Sample&Hold element, etc., or else a combination thereof. According to the invention, the conditioning unit 2 comprises at least one non-linear amplifier stage 23. The receiver 1 of the optical radiation 12 can use as receiving element a photodiode, for example a PIN or avalanche photodiode (APD) having a corresponding bias voltage. By varying the bias voltage of the APD, it is possible to set the gain ratio thereof from, the optical signal towards the electrical signal. In the case of APDs, however, not only the gain but also the noise increases with the bias voltage.

An adaptation of the input sensitivity can also be achieved by varying the gain of amplifier stages which succeed the photoelectric conversion and which can likewise or additionally be varied in terms of their gain factors. When PIN photodiodes are used, the input sensitivity is adapted to the optical input ratios for example by means of the gain factor of the downstream amplifier stage.

Since a variation of the bias voltage and/or of the gain also has effects on other parameters, for instance the bandwidth, the signal delay, etc., here as well a calibration of the distance measurement may in each case be appropriate for different settings. Therefore, here as well, usually defined, discrete steps are used as operating modes.

By way of example, U.S. Pat. No. 3,900,261 also describes so-called AGC (auto gain control) control loops which automatically adapt the gain of the received signal in such a way that their output signal is constant. This technology is used for example in information transmission technology in the receiver circuits, specifically in the radio transmission of frequency-modulated signals. With a constant output signal, in these AGCs—depending on the embodiment—a constant amplitude of the signal envelope, a constant average signal power, a constant EMS value of the signal or else a logarithmic weighting of the signal can be used, as constancy criterion. Since these circuits constitute control loops, these can pose generic problems with regard to the control behaviour (behaviour in response to setpoint changes, behaviour in response to disturbances, tendency towards oscillation, so-called pumping of the AGC controller, etc.). The AGC circuits correspondingly have to be tuned to the respective system in terms of their bandwidth and the control parameters. In the case of the high signal frequencies used in EDMs and their sensitivity to transit time changes in the electronics, the design of an AGC controller can prove to be difficult. Particularly since a continuous reception signal (such as, for example, in the case of FM-modulated broadcast signals) does not prevail in the case of the EDM system described here, rather individual pulses or pulse packets are received, an AGC circuit of this type cannot directly be employed here.

The parasitic effects on the signal that are associated with varying the gain factor of the AGC are disadvantageous with respect to a manually gradated gain variation in so far as a calibration of these effects is dependent on the "unknown" gain of the AGC or the dynamic status thereof. With regard to a simple calibration process, therefore, a gain variation in known steps that is predefined by the control unit is preferable to a dynamic gain factor variation of an AGC that is unknown to the evaluation unit.

According to the invention, the EDM is improved by a high dynamic range of the input signal intensity being made detectable and usable for distance measurement. The amplitude dynamic range of the receiving unit of the EDM is thus improved, or the evaluation of a wide intensity range of the reflected measurement signal is simplified. This is achieved according to the invention by the use of an amplifier having a non-linear input-output characteristic curve. In this case, the gain is degressive, such that low amplitude values of the input signal experience a higher gain than higher amplitude values. A type of compression of the higher amplitude values is thus achieved.

According to the invention, a larger dynamic range in contrast, to the prior art can be covered without, in this case having to carry out a change in the operating mode in the transmitting and/or receiving unit.

According to the invention, a larger input amplitude range can also be detected with the same ADC value resolution. In order to achieve a higher input dynamic range in the receiver, an analogue-to-digital converter having a higher amplitude resolution could also be used. However, such a converter has a higher current consumption and is significantly more expensive than lower-resolution models, specifically if a high time resolution in the form of a high sampling rate is required. Moreover, with higher resolutions the computational complexity for further processing and distance determination also increases, specifically if overshoots of the native resolution of the digital computer (processor, DSP, . . . ) used of e.g. 16, 24 or 32 bits occur, which then have to be handled in a correspondingly laborious and time-consuming manner using software.

In the context of the subsequent digital further processing of the measured values, this non-linearity can also be numerically cancelled, whereby linear measured values can again be employed during the signal evaluation and distance determination if this is required by the evaluation concept. Such a digital "gain" or expansion of the signals previously "attenuated" or compressed in analogue fashion in the non-linear amplifier no longer brings about a temporal shift, since this takes place after the time-quantizing sampling.

Possible shifts in the phase response or the signal delays of the non-linear amplifier stage according to the invention can furthermore be compensated for with the aid of calibration parameters, wherein in contrast to the prior art now the entire input range can be covered with fewer calibration parameters.

The intensity range that can be detected by the receiver, this range being increased according to the invention, can also simplify the detection of a reference signal tapped off with a fixed coupling-out rate from the transmitter by the receiver unit, since, according to the invention, the range between highest and lowest intensity of the received light which can be used for the distance measurement is increased.

The—in accordance with the modulation: of the emitted optical signal (and thus also of the received optical signal)—high-frequency electrical output or reception signal of the photosensitive element 1 can foe conditioned, in particular impedance-converted, amplified, filtered and/or hand-limited, prior to the further processing and conditioning 2. By way of example, such an amplifier stage can, inter alia, also be constructed with a circuit according to EP 2 183 865. One example of one of the many possible signal filterings in the context of the conditioning 2 is shown for instance in WO 2011/076907. An above-described operating mode change can also be provided, for example by changing an APD bias voltage or a gain factor, wherein this is initiated by the evaluation unit and does not constitute an amplifier stage according to the invention having a non-linear input-output characteristic.

The conditioned reception signal is digitized—that is to say quantified in terms of time and value—by an analogue-to-digital converter 3 and fed to a digital computing unit 4 (a microprocessor, DSP, FPGA, ASIC, etc) for further processing and determination of the distance. If appropriate, the EDM system can be equipped with an additional external processor, microcontroller or DSP, which can specifically perform evaluation or inter facing tasks, for example the provision of an operating interface or a communication interface.

Processing of strong and weak reception signals can be carried out with the principle according to the invention. Therefore, even light signals having greatly different intensities can be detected, which, for example, can also make it possible to determine distances of a plurality of targets at different distances and having different reflectivities which are situated along the measuring direction. As a result of a change—conventional in the prior art—in the (transmitter- or receiver-side) operating mode in which avoiding a saturation of the receiver on account of the most dominant reflective target constitutes the setting criterion, the signals of more weakly reflective targets can be swamped in noise and therefore undetectable. One example of this is also a reference signal coupled out with a fixed portion, which reference signal, according to the invention, is detectable even without saturation of the receiver together with a further range of reception signals.

FIG. 2 shows an exemplary use of a distance measuring device 99 according to the invention in an observation apparatus 19, which can be used for aiming at a target object 11 and determining the distance 13 thereof from the observer. In this case, the observation apparatus has an observation direction at least approximately corresponding to the measuring direction of the distance measurement, such that a distance from an observed target point 11 can be determined by means of the distance measuring device 99. By way of example, by means of inclination sensors in the observation apparatus (or in a stand supporting the observation apparatus), if is additionally possible to determine an inclination of the measuring direction with respect to the horizontal, for example in order to determine a horizontal projection of the distance 13 determined by the EDM. Moreover, an azimuthal measuring direction can be determined, for example, by means of a compass or a vertical angle measurement in the observation apparatus or stand. The apparatus can thus be used, for example, for determining geographical coordinates of the target object 11.

FIG. 3 shows an exemplary input-output characteristic curve of an amplifier stage 2 according to the invention, wherein the level of the input signal—that is to say the intensity of the optical reception signal 12—is represented on the abscissa (designated by IN) and the level of the output signal of the amplifier stage 23 is represented on the ordinate (designated by OUT). Level can be understood to mean an electrical voltage value, for example, but also if appropriate a current value or the optical reception intensity. The illustrated non-linear amplifier characteristic curve 24 of this embodiment has a piecewise linear gain, having a first gain factor 81 and a second gain factor 83, different from the first, which merge into one another at a knee point 82 at a threshold value of the input signal. The gain factor in each case corresponds to the gradient of the characteristic curve. In this case, gain is also understood to mean a gain factor of less than one or else a negative gain value (which is also designated as damping or as an inverting amplifier). In the embodiment illustrated, the gain factor for low input signals below the threshold value at the knee point 82 is greater than that above the knee point. Consequently, the signal dynamic range is compressed, that is to say that an input value range is mapped non-linearly onto an output value range, in particular wherein the mapping can be described by a multiplicative factor which in terms of absolute value is degressive towards higher input values. In this case, in the definition of the higher input signal in an electronic circuit, the electrical input signal of the amplifier stage is not necessarily associated with a—seen in absolute times—higher current or voltage value, since the electrical input signal, with respect to the received optical signal intensity, can be for example inverted and/or biased with a positive or negative bias. In such cases, the term "higher" should rather be regarded as a greater deviation relative to a basic state of the signal.

In another embodiment, a plurality of such knee points and further gain factors can also be present.

FIG. 3 also illustrates the second input-output characteristic 85 of a conventional linear amplifier stage from the prior art as a dotted line. The saturation 85A shown here for the amplifier stage when the input is overdriven should not be regarded here as a non-linear characteristic within the meaning of the present invention, specifically since it lies outside the specified operating range and, in the case of signals above the saturation value, amplification no longer occurs either, which makes it impossible for example to numerically cancel the compression, since an unambiguous assignment of the measured and input values is not possible in the overdriving range. Rather, this concerns a parasitic effect which occurs in any amplifier circuit but is not used or cannot be used there without further precautions according to the invention for compression. According to the invention, the first and second gain factors within the operating range are not equal to zero. In the specified operating range, the non-linear input-output characteristic 24 according to the invention uniquely maps an input signal of the amplifier stage 23 onto an output signal of the amplifier stage 23. For the sake of clarity, a non-inverting amplifier stage having bias values of zero is illustrated; both a bias-governed offset of the characteristic curve and a mirroring of the characteristic curve by an inverting amplifier stage can occur in practical embodiments.

The third input-output characteristic 84, illustrated by an interrupted line, is that of an idealised AGC which corrects the output signal level to a constant value independently of the input signal level, or at least attempts to do this.

Figure 4:
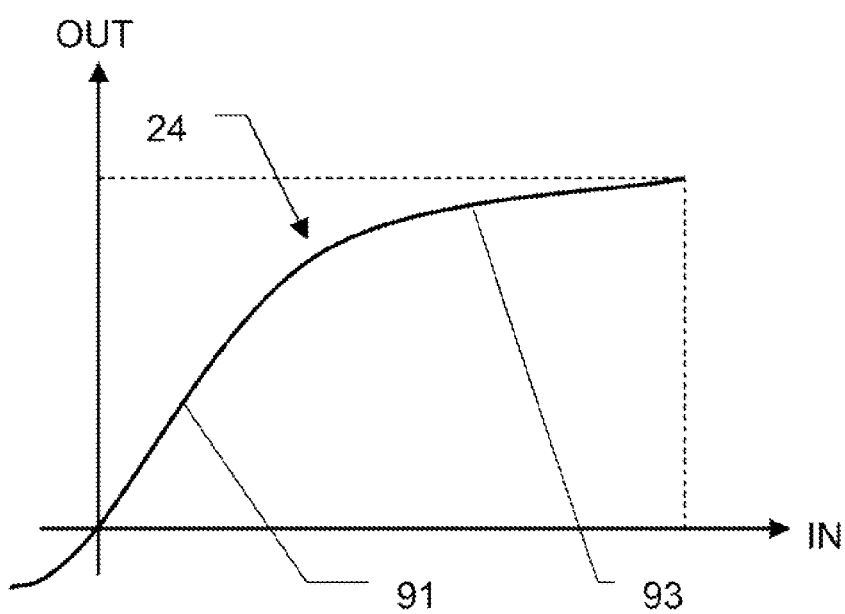
FIG. 4 shows an illustration of an exemplary second embodiment according to the invention of an input-output characteristic curve of an amplifier in an EDM.

FIG. 4 illustrates an embodiment of an input-output characteristic 24 according to the invention which likewise brings about a compression, but does not have a discontinuous knee point, but rather a continuous profile. The illustration once again shows a first partial range 91 for low input signals having a higher gain factor than the second partial range 93 for higher input signals. The transition between the partial ranges in this case takes place in fluid fashion or continuously.

Figure 5:
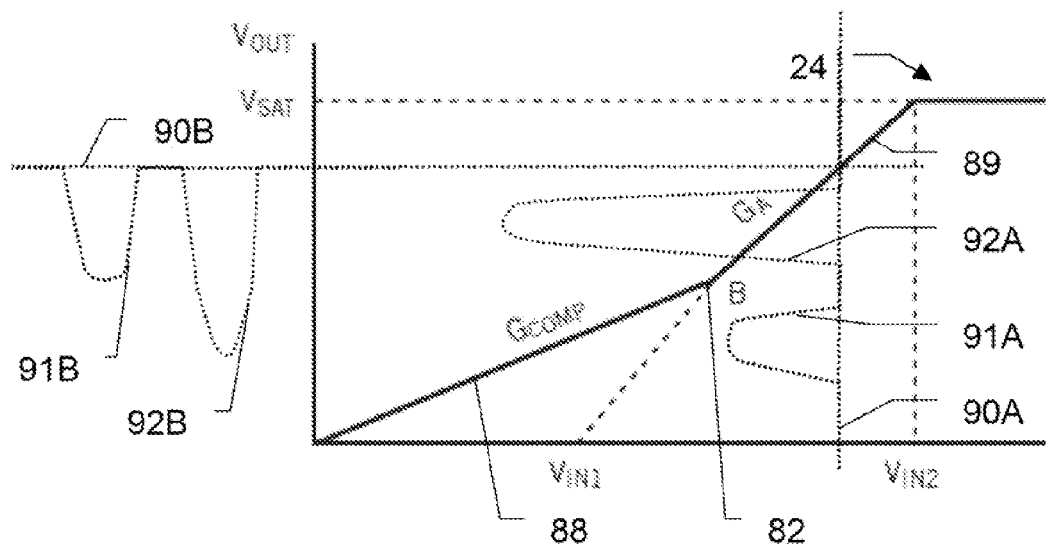
FIG. 5 shows an illustration of an exemplary third embodiment according to the invention of an input-output characteristic curve of an amplifier in an EDM.

FIG. 5 illustrates a further embodiment of an input-output characteristic 24 according to the invention which likewise brings about a compression, but is designed for an inverted, biased input signal. This is achieved with the aid of the exemplary signal pulses 91A and 92A which are applied to the non-linear amplifier stage 23 and which have a bias offset 90A. The profile of the non-linearity is once again piecewise linear, with a discontinuous knee point 82 and two different gain values 88 and 83. The behaviour of the amplifier stage 23 with the characteristic curve 24 is shown with the aid of the two input pulses 91A and 92A, which are shaped to form the respective output pulse 91B and 92B with the output bias 90B.

The knee point upon the saturation of the amplifier VSAT should not be reached in the normal operating case, or in such a case am operating mode change should be carried out on the transmitter and/or receiver side in order to avoid overdriving. The knee point at VSAT should also not be regarded as a knee point according to the invention, since a gain factor of zero prevails after this, as a result of which signal levels above VIN2 can no longer be distinguished from one another.

Figure 6:
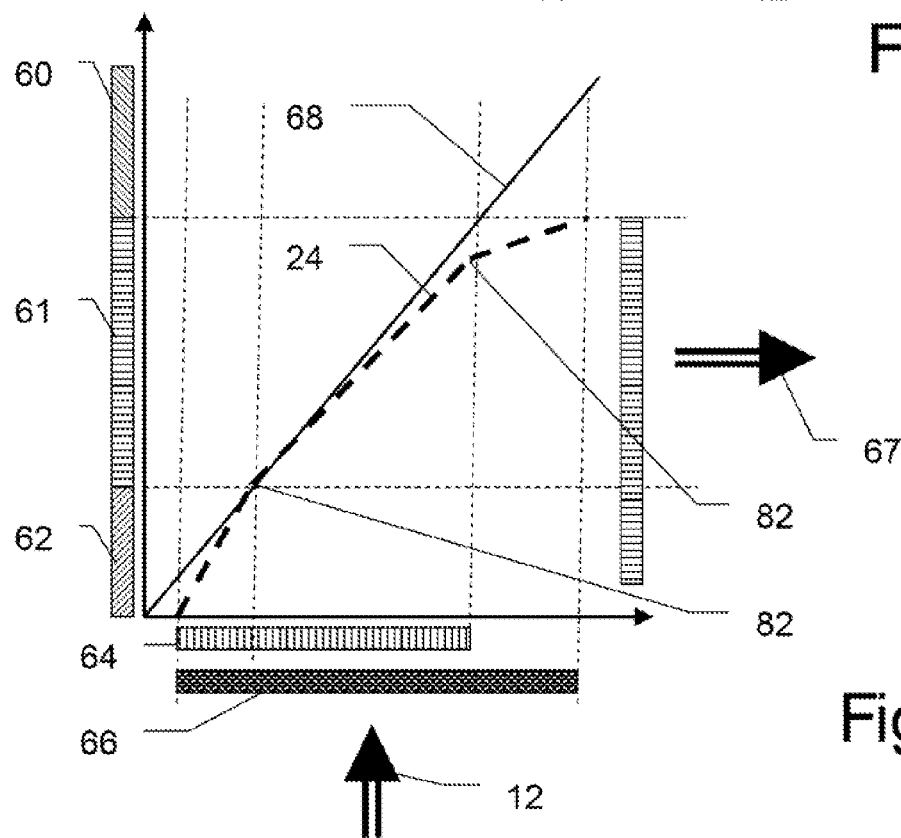
FIG. 6 shows an illustration of an exemplary fourth embodiment according to the invention of an input-output characteristic curve of an amplifier in an EDM.

FIG. 6 illustrates the detectable amplitude dynamic range—extended according to the invention—of an EDM receiving unit with the aid of a comparison of a known linear amplifier stage with an embodiment of a non-linear (or piecewise linear) amplifier stage according to the invention. The amplitudes of the signals during the digitization, which are divided into three ranges, are represented on the ordinate. The upper range 60 represents overdriving of the ADC, in which the signals cannot be detected, rather only the saturation value of the ADC is output. The middle range 61 is the actual measurement range of the ADC, in which the signal levels can be evaluated and converted and, as digital input representation 67, can be used effectively for further processing and distance measurement. The lower range 62 represents the noise range. In the case of corresponding evaluation concepts for determining the distance, it is possible, for example by accumulation of measured values from a plurality of measurements, far uncorrelated noise to be averaged out and thus also for the correlated measurement signals lying below the noise level to be made at least partly detectable.

The diagram shows the traditional linear input-output characteristic 63 of a linear amplifier stage from the prior art, which reveals the reception signal range 64 detectable therewith on the ordinate, which represents the intensity of the optical input signal of the distance measuring device.

In contrast to the prior art, an exemplary non-linear input-output characteristic 24 according to the invention produces a larger detectable input range 66, which is brought about by the non-linearity and the knee points 82 in the characteristic 24. The lower knee point 82 illustrated here is optional.

In the following evaluation of the digitized signal for determining the distance in an evaluation unit (e.g. a digital computing unit, CPU, DSP, FPGA, ASIC etc.), the non-linearity of the amplifier stage 23 can be numerically cancelled again if the evaluation concept requires a linear signal representation. Consequently, according to the invention, a larger amplitude range of the received signal is detectable without the operating mode of the receiver having to be changed (or correspondingly fewer operating mode changes are required on the transmitter side). The price of a lower amplitude resolution brought about as a result in partial ranges of the digitized signal can be disregarded or made good, with corresponding design of the EDM system.

For electronically realizing the non-linear amplifier 23 according to the invention in an EDM, a plurality of circuitry approaches are possible, which are explained with reference to the following figures, wherein the configurations shown here should not be regarded as an exhaustive enumeration. Only the basic circuits for producing the transfer characteristic are illustrated here; practical circuitry embodiments can correspondingly be extended if appropriate. The person skilled in the art who is familiar with the field of electrical engineering can derive the corresponding mathematical representations of the characteristics or determine them by numerical simulations. By way of example, in the circuits presented here, temperature compensation circuits or other circuits for reducing error influences can be employed, although they are not illustrated here for the sake of clarity.

Figure 7A:
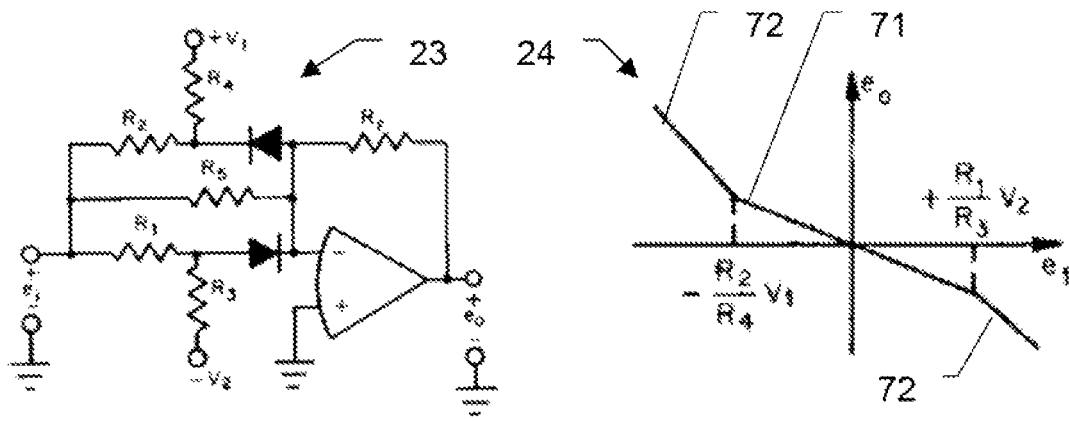
FIG. 7a shows an exemplary illustration of a first circuitry embodiment of an amplifier stage according to the invention of an EDM with the input-output characteristic curve thereof.

FIG. 7a shows on the left a first circuit diagram of an amplifier stage 23 comprising a so-called series limiter circuit, and on the right next to that the non-linear input-output characteristic 24 obtained therewith. The embodiment illustrated has an inverting effect with a progressive gain factor, in which a first gain 71 for low input signals $e_i$ is lower than the second gain 72 for higher signals. Since the customary electro-optical receiving elements do not generate negative output signals, the negative input signal range can be disregarded in the application described here, if corresponding measures such as, for example, biasing, high-pass filtering, etc. are not used. In order to obtain only one knee point, it is also possible for one of the two diode branches to be omitted. By way of example, the characteristic curve from FIG. 5 can be realized with this circuit.

Figure 7B:
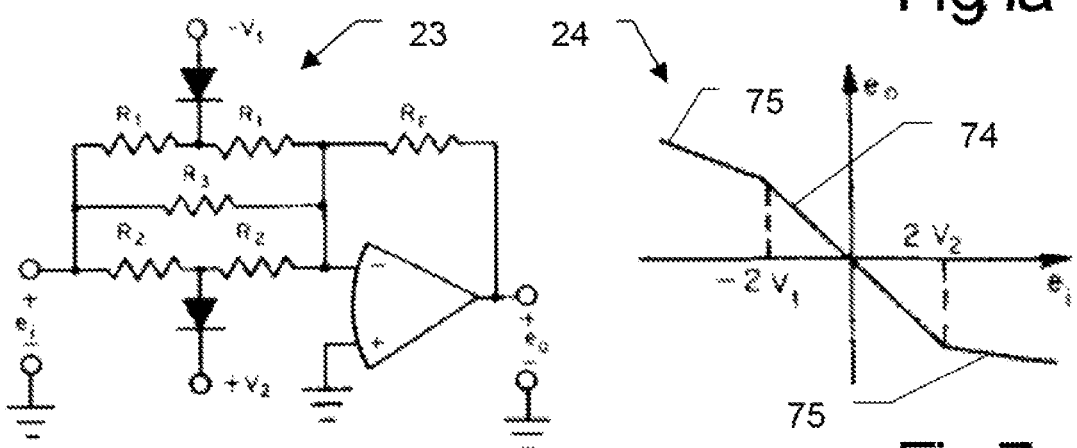
FIG. 7b shows an exemplary illustration of a second circuitry embodiment of an amplifier stage according to the invention of an EDM with the input-output characteristic curve thereof.

FIG. 7b shows on the left a second circuit diagram of an amplifier stage 23 comprising a so-called shunt limiter circuit, and on the right next to that the non-linear input-output characteristic 24 obtained therewith. The embodiment illustrated has an inverting effect with a degressive gain factor, that is to say that the gain 74 is greater than the gain 75. In order to obtain only one knee point, it is also possible for one of the two diode branches to be omitted.

Figure 7C:
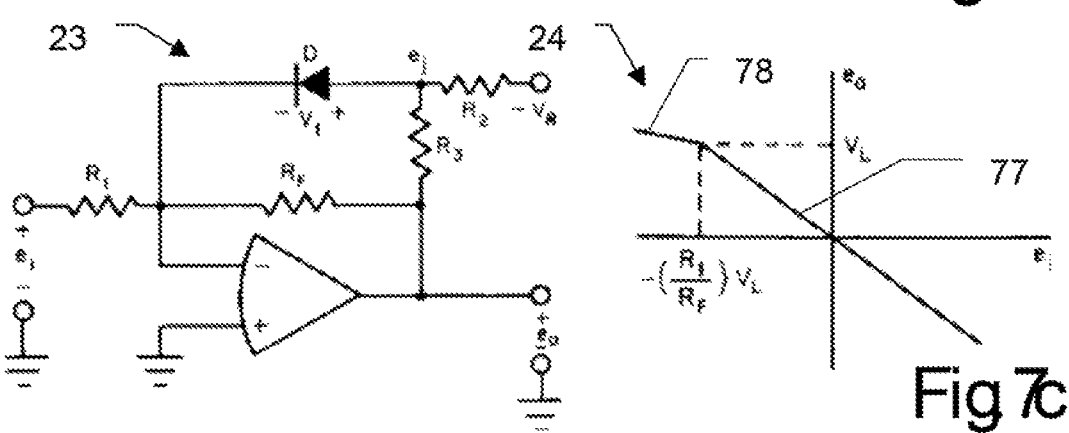
FIG. 7c shows an exemplary illustration of a third, circuitry embodiment of an amplifier stage according to the invention of an EDM with the input-output characteristic curve thereof.
Figure 8:
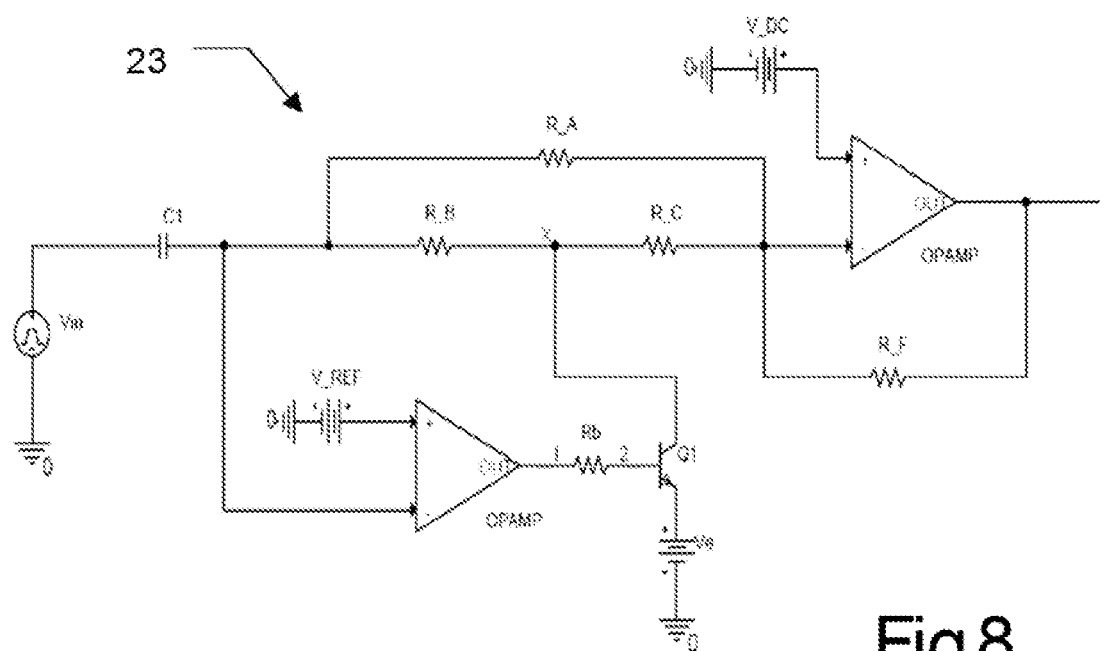
FIG. 8 shows an exemplary schematic illustration of a fourth circuitry embodiment of an amplifier stage according to the invention.

FIG. 7c shows on the left a second circuit diagram of an amplifier stage 23 comprising a so-called feedback limiter circuit, and on the right next to that the non-linear input-output characteristic 24 obtained therewith. The embodiment illustrated can be operated in an inverting fashion and the inverting effect can be cancelled by further measures (for example by an upstream and/or downstream signal inversion, corresponding input polarity, biasing, etc.). The embodiment shown has a degressive gain characteristic curve 24 having a high gain 77 for small input signals $e_i$ and, in contrast thereto, a lower gain 78 for high input signals $e_i$.

Figure 12:
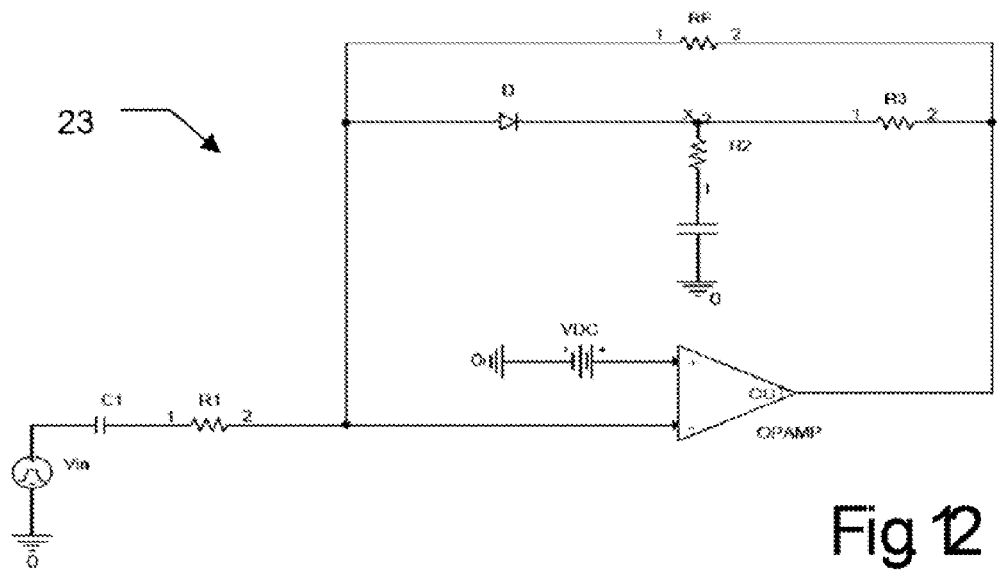
FIG. 12 shows an exemplary electrical schematic diagram of a further circuitry embodiment of an amplifier stage according to the invention.

It goes without saying that the circuits from FIGS. 7a, 7b, 7c and/or FIG. 12 can be combined both with one another and multiply with themselves in order to obtain, for example, characteristic curves having a plurality of knee points. What is common to the three circuits is that, as a result of diodes becoming conductive in the feedback network or in the input starting from a certain voltage threshold value, said circuits vary the ratios in a gain-determining feedback network and thereby bring about a change in the gain factor.

FIG. 3 shows an exemplary circuit diagram of an embodiment of a non-linear amplifier stage 23 according to the invention comprising a voltage comparator. In this case, when a threshold value V_REF is exceeded by the input amplitude, the comparator causes an abrupt change in the gain factor of the amplifier stage 23 to another value.

Figure 9:
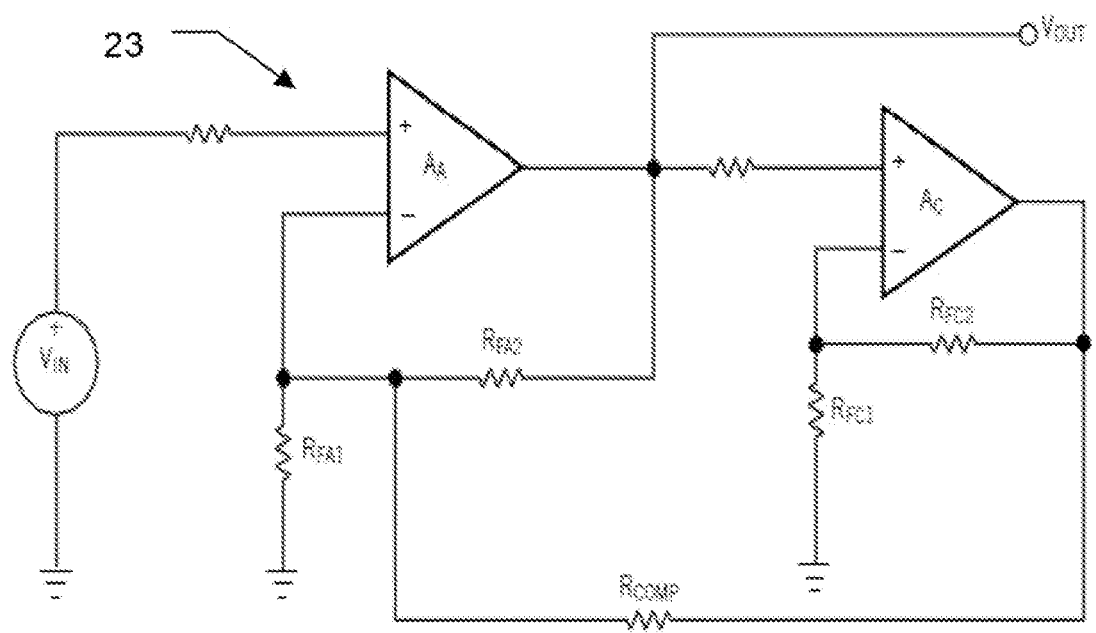
FIG. 9 shows an exemplary schematic illustration of a fifth circuitry embodiment of an amplifier stage according to the invention.

FIG. 9 shows an exemplary schematic diagram of an embodiment of a non-linear amplifier stage 23 according to the invention, which obtains a non-linear characteristic 24 with a plurality of amplifiers which attain saturation at different input voltages.

Figure 10:
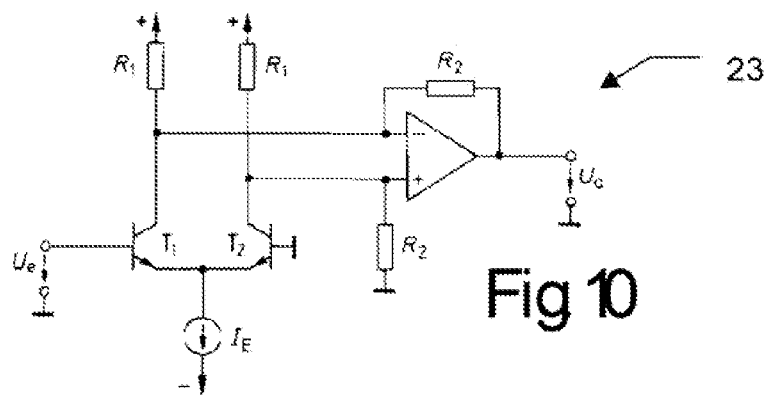
FIG. 10 shows an exemplary schematic illustration of a sixth circuitry embodiment of an amplifier stage according to the invention.

FIG. 10 shows an exemplary schematic circuit diagram of an embodiment of a non-linear amplifier stage 23 according to the invention, which has a continuous characteristic in the form of a sine approximation, for example approximately similar to that illustrated in FIG. 4. Correspondingly more complex approximations of sine functions with a plurality of knee points, temperature compensation, etc. are also known in the literature.

Figure 11A:
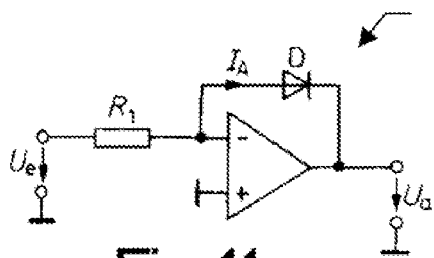
FIG. 11a shows an exemplary schematic illustration of a seventh circuitry embodiment of an amplifier stage according to the invention.
Figure 11B:
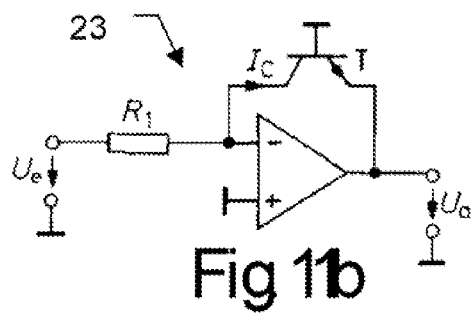
FIG. 11b shows an exemplary schematic illustration of an eighth circuitry embodiment of an amplifier stage according to the invention.

FIG. 11a and FIG. 11b show exemplary schematic circuit diagrams of embodiments of non-linear amplifier stages 23 according to the invention which have a logarithmic input-output characteristic curve 24.

Besides the non-linear input-output transfer functions shown in FIGS. 10, 11a and 11b, others are also known, for instance exponential functions, or else freely adjustable functions, e.g. approximated by power series realized by circuitry. Circuits of this type likewise have input-output characteristics according to the invention. In the EDM application described here, however, consideration should also be given to further secondary conditions, such as, for instance, low noise factors, low current consumption, temperature and aging stability, no or only very low trimming outlay, during production and for the time measurement also a stable time behaviour. In view of the entire range of requirements, therefore, a simple, partly linear amplifier stage having one or two knee points in the input-output characteristic curve may indeed be preferable to more complex circuits—which can be determined by calculations or simulations in the respective concrete exemplary embodiment.

FIG. 12 shows a further embodiment according to the invention of a circuitry realization of a non-linear amplifier stage 23 according to the invention in an EDM, which follows the design principle of FIG. 7c. This embodiment is distinguished, inter alia, by the fact that with this circuit the position of the knee point can be varied in a simple manner, the circuit is well suited to fast or high-frequency signals on account of its small capacitive effect and the energy consumption is also small owing to the small number of components. In contrast to FIG. 7c, the polarity of the diode is reversed and a bias is applied to the non-inverting input of the OPAMP. The inverting behaviour can be cancelled, for example, by a cascading of FIG. 7c and FIG. 12, wherein two coinciding or two separate knee points 82 can be realized.

What is claimed is:

1. An electro-optical distance measuring device, comprising:
   a transmitting unit comprising a light source, for emitting intensity-modulated optical radiation, a receiving unit for receiving a portion of the optical radiation, said portion being reflected from a target object, by means of a photosensitive electrical component and for converting it into an electrical reception signal;
   a conditioning unit for conditioning the reception signal comprising at least one amplifier stage;
   an analogue-to-digital converter for digitizing the conditioned reception signal; and
   an electronic evaluation unit, which is designed in such a way that a distance from the distance measuring device to the target object can be determined on the basis of a signal propagation time with the aid of the digitized reception signal, wherein the amplifier stage has a non-linear input-output characteristic which uniquely maps an input signal of the amplifier stage onto an output signal of the amplifier stage, and wherein the amplifier stage is designed with a first gain factor for a first amplitude value of the input signal and at least one second gain factor, different from the first, for a second amplitude value of the input signal.

2. The distance measuring device according to claim 1, wherein the amplifier stage has a first gain factor for reception signal amplitudes below a threshold value and has a second gain factor for reception signal amplitudes above the threshold value.

3. The distance measuring device according to claim 1, wherein the input-output characteristic is a piecewise linear function, with at least one knee point and at last two discrete gain factor ranges each having a constant gain factor.

4. The distance measuring device according to claim 1, wherein the input-output characteristic is a continuous non-linear function.

5. The distance measuring device according to claim 1, wherein the electronic evaluation unit is designed in such a way that it numerically compensates for the non-linearity of the amplifier stage and re-establishes a linear representation of the reception signal.

6. The distance measuring device according to claim 1, wherein the non-linear input-output characteristic is effected by a non-linear feedback of the amplifier stage, wherein the latter is achieved by a saturation of a component of the feedback of the amplifier stage, wherein, however, the totality of the amplifier stage and the photosensitive component remain unsaturated.

7. The distance measuring device according to claim 6, wherein the non-linear feedback is obtained by means of a diode or a zener diode in a feedback network.

8. The distance measuring device according to claim 6, wherein it numerically compensates by means of determining the distance by means of a numerical compensation unit for computationally nullifying the non-linear input-output characteristic at the digitized reception signal with the aid of an inverse of the non-linear characteristic.

9. The distance measuring device according to claim 1, wherein the distance measuring device is integrated in an observation apparatus having an observation direction whose optical axis runs at least approximately parallel to a measuring direction of the distance measuring device.

10. The distance measuring device according to claim 1, wherein the amplifier stage is designed in such a way that it effects an amplitude dynamic range compression, and wherein the first gain factor is greater than the second gain factor.

11. A distance measuring method, comprising:
emitting amplitude-modulated optical radiation;
receiving a portion of the optical radiation, said portion being reflected from a target object, by means of a photosensitive electrical component, which converts the received optical radiation into an electrical reception signal, amplifying the reception signal in an amplifier stage;
digitizing the amplified reception signal by means of an analogue-to-digital converter; and determining a distance from the distance measuring device to the target object on the basis of a signal propagation time by means of evaluating the digitized reception signal by means of an electronic evaluation unit, wherein the amplification of the reception signal with compression of the amplitude dynamic range is effected by an amplifier stage having a non-linear input-output characteristic which uniquely maps an input signal of the amplifier stage onto an output of the amplifier stage.

12. The method according to claim 11, wherein the amplification is effected with a first gain factor below a threshold value of the reception signal amplitude and with a second gain factor above the threshold value, wherein the first gain factor is greater than the second gain factor.

13. The method according to claim 12, wherein the amplification is effected with an input-output characteristic which is piecewise linear and has at least one knee point.

14. The method according to claim 12, wherein the evaluation of the digitized reception signal is effected by means of numerical compensation of the non-linearity of the amplification.

15. The method according to claim 12, further comprising compressing the amplitude range of a reception signal of the distance measuring device by means of an analogue, non-linear amplifier stage which uniquely maps an output signal of the amplifier stage onto an output signal of the amplifier stage, and digitizing the compressed amplitude range, and numerically expanding the digitized amplitude range for re-establishing a linear representation of the reception signal for a distance determination by an evaluation unit.

16. The method according to claim 15, wherein the numerical compensation is done by expanding the digitized reception signal with an inverse of the non-linear input-output characteristic for re-establishing a linear representation of the electrical reception signal.

17. A non-transitory computer readable medium comprising program code for carrying out a distance measuring method comprising:
emitting amplitude-modulated optical radiation, in particular laser light;
receiving a portion of the optical radiation, said portion being reflected from a target object, by a photosensitive electrical component, which converts the received optical radiation into an electrical reception signal;
amplifying the reception signal in an amplifier stage;
digitizing the amplified reception signal by means of an analogue-to-digital converter; and
determining a distance from the distance measuring device to the target object on the basis of a signal propagation time by means of evaluating the digitized reception signal by means of an electronic evaluation unit, wherein the amplification of the reception signal with compression of the amplitude dynamic range is effected by an amplifier stage having a non-linear input-output characteristic, which uniquely maps an input signal of the amplifier stage onto an output signal of the amplifier stage with a reception-signal-amplitude-dependent gain factor, and a degressive gain factor towards higher reception signal amplitudes.

18. The non-transitory computer readable medium of claim 17, wherein the program code carries out numerical compensation of a non-linear gain in the amplifier stage of a receiving unit of the distance measuring device.

19. The non-transitory computer readable medium of claim 17, wherein the program code is executed in the evaluation unit of the distance measuring device.

* * * * *